United States Patent [19]

Shoup et al.

[11] 4,074,103
[45] Feb. 14, 1978

[54] APPARATUS FOR WELDING STUDS TO WORKPIECES

[75] Inventors: Thomas E. Shoup, Amherst; Steve Spisak, Elyria, both of Ohio

[73] Assignee: TRW Inc., Cleveland, Ohio

[21] Appl. No.: 648,052

[22] Filed: Jan. 12, 1976

[51] Int. Cl.$^2$ ............................................ B23K 11/04
[52] U.S. Cl. ........................................ 219/98; 219/99
[58] Field of Search .................................... 219/98, 99

[56] References Cited

U.S. PATENT DOCUMENTS

| 1,995,001 | 3/1935 | Ito ........................................... 219/98 |
| 3,340,379 | 9/1967 | Sweeney ................................. 219/99 |
| 3,426,394 | 2/1969 | Poupitch ................................ 219/99 |

*Primary Examiner*—E. A. Goldberg
*Attorney, Agent, or Firm*—Allen D. Gutchess, Jr.

[57] ABSTRACT

A method and apparatus for welding studs to workpieces are provided. The invention is particularly concerned with welding studs to workpieces made of materials having relatively low electrical resistance but covered with layers of other materials having higher electrical resistance, a common example being metal workpieces having painted surfaces. In order for the stud to make effective electrical contact with the workpiece at the beginning of the welding cycle, the paint must be eliminated; in accordance with the invention, this is accomplished by rotating the stud which effectively removes the portion of the paint in contact with the stud. Electrical contact can then be established between the stud and the workpiece to enable the welding cycle to be initiated.

5 Claims, 9 Drawing Figures

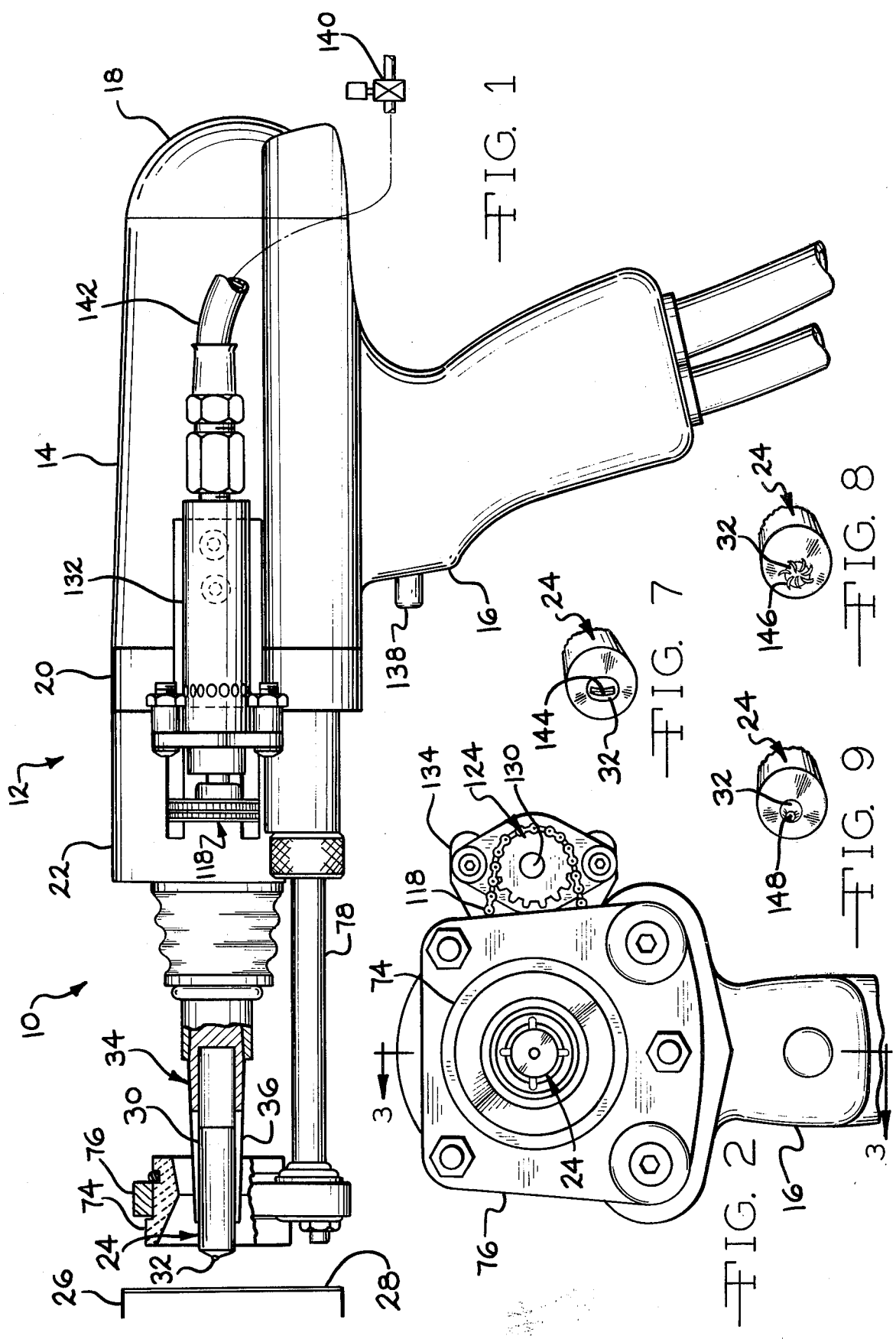

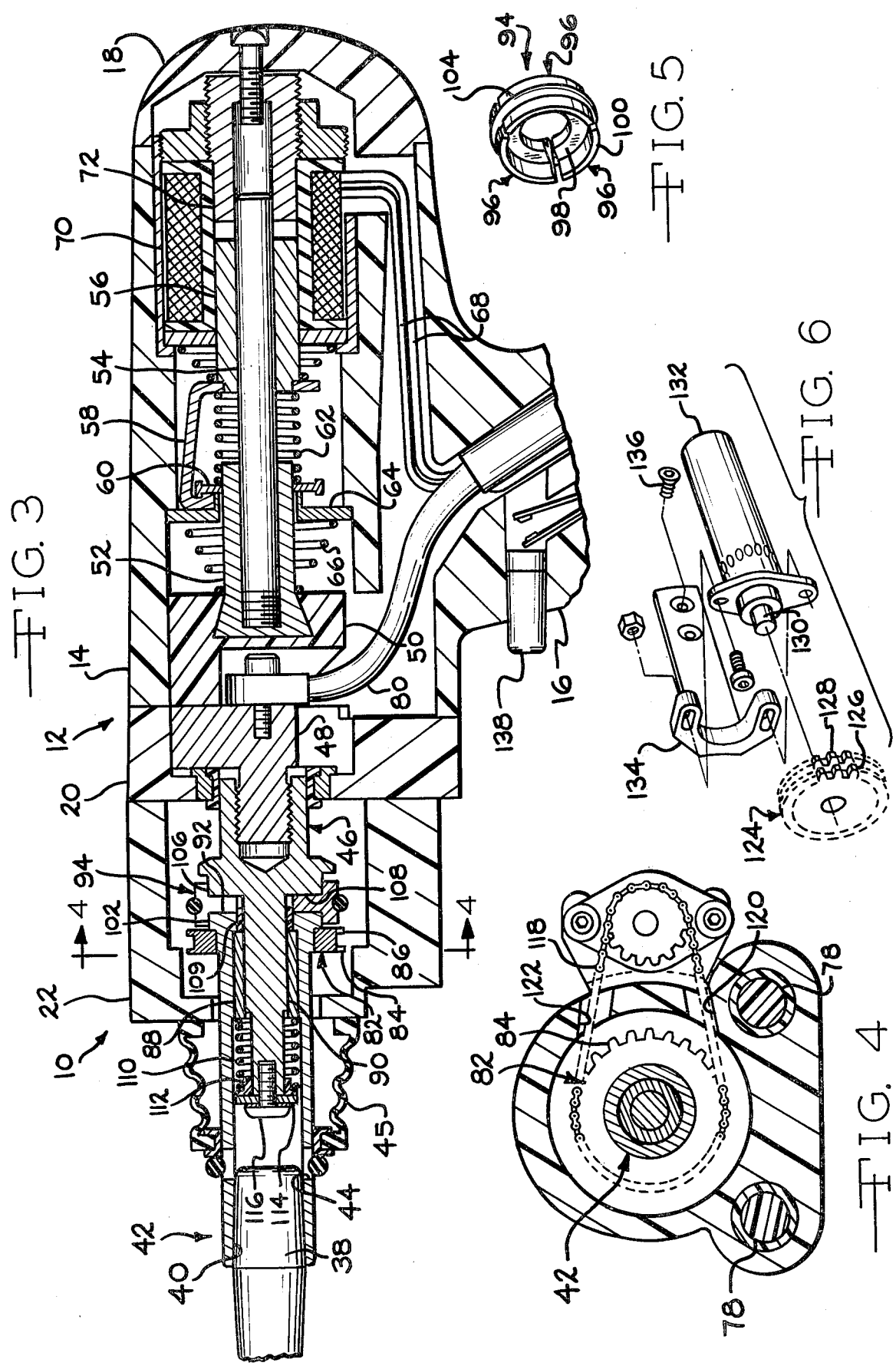

APPARATUS FOR WELDING STUDS TO WORKPIECES

This invention relates to a method and apparatus for welding a stud to a workpiece having a layer of electrically-resistant material thereon.

Welding studs to workpieces, particularly by a drawn-arc technique, is becoming more widely accepted and finding more and more applications. In some of these applications, the workpiece to which the stud is to be welded has a layer of material thereon which has a relatively high electrical resistance. In such instances, it is necessary to remove at least a portion of that layer to provide an effective electrical path between the stud and the workpiece before the stud can be welded thereto. Such materials are commonly paint or similar coating material, but can also be rust, scale, or corrosion, by way of example. Heretofore, such layers have commonly been removed manually by the operator by the use of a wire brush, scraper, abrasive wheel, etc. prior to welding. This is time-consuming and laborious. Some attempts have also been made to remove the layer automatically, but such have been slow or inoperative on certain types of materials or thick layers, or have had other disadvantages.

The present invention provides a method and apparatus for removing the material between the stud and the workpiece by rotation of the stud while in contact with the material layer. This has been found to be relatively rapid and efficient and is more effective on thicker layers and certain materials than with approaches heretofore taken.

The stud can be rotated by hand or power driven. In the former case, a stud with a cross-drilled hole therein can be turned by the operator inserting a small diameter rod into the hole. Also, by way of example, a pinion can be mounted on the chuck adapter or the chuck which holds the stud and rotated by reciprocation of a rack meshing therewith. In a preferred form, however, the rotation of the stud can be accomplished through a motor mounted on the welding tool. The motor is small and light in weight, and can be automatically operated when the trigger of the tool is actuated. The penetration of the rotating stud through the electrically-resistant layer usually is accomplished in a fraction of a second so that the time of the overall welding cycle including the removal of the layer is little more than that required for the welding cycle itself.

It is, therefore, a principal object of the invention to provide a method and apparatus for welding studs to workpieces having electrically-resistant layers thereon.

Another object of the invention is to provide a method and apparatus for welding studs more rapidly and efficiently to workpieces having electrically-resistant layers thereon.

A further object of the invention is to weld a stud to a workpiece by first rotating the stud prior to initiating the welding cycle.

Many other objects and advantages of the invention will be apparent from the following detailed description of preferred embodiments thereof, reference being made to the accompanying drawings, in which:

FIG. 1 is a side view in elevation, with parts broken away and with parts in cross section, of a stud welding tool embodying the invention;

FIG. 2 is a fragmentary front view in elevation of the stud welding tool of FIG. 1;

FIG. 3 is a view in longitudinal, vertical cross section taken along the line 3—3 of FIG. 2;

FIG. 4 is a view in transverse cross section taken along the line 4—4 of FIG. 3;

FIG. 5 is a detail view in perspective of a component of the tool embodying the invention;

FIG. 6 is a somewhat schematic view in perspective of a mounting arrangement for a component of the tool; and FIGS. 7–9 are fragmentary views in perspective of welding studs which can be used with the welding tool.

The weldment of various studs to workpieces is finding wider and wider applications and is being used more and more in manufacturing operations. Frequently, the manufacturing process requires that the studs be welded to workpieces or partially finished products after they have been painted or at least after a primer has been applied thereto. Such a coating material usually exhibits a high electrical resistance and requires removal in the area to which the stud is to be welded prior to the welding cycle. Heretofore, this has commonly been done by the operator employing a scraper, wire brush, abrasive wheel, or the like, necessitating the use of more labor and time. Some attempts have been made to overcome the electrical resistance of the paint through the use of high frequency current between the stud and the workpiece. This has not been effective as desired and the high frequency often disturbs other electrical operations or apparatuses. Attempts have also been made to remove the paint by rapidly reciprocating the stud to peck at the paint. This has lacked reliability in penetration of the paint under many conditions and "breakthrough" time is relatively long, especially on paint that has been on the product for some time.

The present method and apparatus involving rotation of the stud to remove the electrically-resistant layer is substantially more reliable for removing various types and thickness of layers, and is also more effective in removing coating material or paint that has been applied for more than just a few days to the workpiece or product. The "break-through" time is also substantially shorter in most instances and the disadvantages of previous approaches are not encountered with the stud rotation technique according to the invention.

Especially for low production operation, the stud can be placed into contact with the elecrically-resistant layer and rotated by hand to remove the layer or at least a sufficient amount of it to establish electrical contact between the stud and the workpiece. Thus, if the stud has a cross-drilled hole therein, a small diameter rod can be inserted therein and the stud rotated in one direction or rotated through less than one revolution and then back in the opposite direction through a partial revolution with this repeated until electrical contact is established.

The stud can also be rotated by rotating the chuck adapter which holds the chuck in which the stud is located. The chuck adapter can have a pinion gear extending radially outwardly therearound and meshing with a gear rack. The rack can then be reciprocated by the operator or by drive means again to rotate the stud in opposite directions. The stud can also be rotated by a pair of bevel gears, one attached to the chuck adapter and one mounted on a flexible shaft. The shaft can then be rotated by a remotely-located motor. However, in a preferred form, the chuck adapter is rotated by a small motor mounted on the side of the welding tool. The motor can drive a sprocket which, in turn, drives a sprocket mounted around the chuck adapter through a suitable chain. A small, lightweight motor can be used for this purpose which does not interfere to any degree with the operation of the welding tool. With this arrangement, the penetration of the rotating stud through the electrically-resistant layer is rapidly accomplished so that little time is added to the overall welding cycle and no additional labor is required to remove the paint. Of course, the invention is also applicable to electrically-resistant layers on workpieces other than paint or similar coating material. Thus, the invention can be advantageously used with workpieces which are rusted or corroded or have scale or other electrically-resistant contaminants thereon.

Referring now to the drawings and particularly to FIG. 1, a welding tool 10 preferably is used to weld a stud to a workpiece by a drawn-arc technique. For this purpose, the tool includes means for retracting the stud from the workpiece, means for holding the stud in the retracted position, and means for subsequently moving the stud toward and against the workpiece. A power source and controls impose a voltage between the stud and the workpiece as the stud is withdrawn to form a pilot arc. The controls also determine when the stud is plunged back toward the workpiece, and when a higher current is imposed on the pilot arc to establish a main welding arc between the stud and the workpiece. The main welding arc melts a portion of the end of the stud and a portion of the workpiece, with the molten metal portions then joining and solidifying as the stud engages the workpiece, to provide a secure weld therebetween.

The stud welding tool 10 includes a main body or housing 12 of a suitable dielectric material, the body having a main section 14, a grip or handle 16, a separable rear end cap 18, a front extension 20, and a forward end section or cover 22. A stud 24 of FIG. 1 is about to be positioned against a workpiece 26 to be welded thereto. In this instance, the workpiece 26 is of a metal or other material having a low resistance to electricity and has a layer 28 thereon having a higher resistance to electricity. The stud 24 includes a main shank 30 and a tip 32 of welding flux located at the forward, weldable end of the stud. The flux can be of various materials and can even be in powder form and suitably encapsulated at the end of the stud. Some small diameter studs may not require any flux at all, with the end of the stud simply pointed to some degree.

The stud 24 is held in a stud holder or chuck 34 having slots forming fingers 36 which resiliently engage the shank 30 of the stud 24. The chuck requires replacement from time-to-time and for this purpose, it has a tapered rearward end 38 (FIG. 3) which is received in and frictionally held by a tapered recess 40 of a chuck adapter 42. The adapter has transverse openings 44 located near the rear extremity of the chuck 34 so that a tapered bar or pin can be inserted therein to force the chuck 34 out of the adapter. A dust bellows 45 is also positioned around a portion of the adapter 42 and extends to the cover 22. The chuck adapter 42 is rotatably mounted on a chuck adapter extension 46 in the forward cover 22. The extension is threadably engaged with a cable clamp 48 which, in turn, is attached to a lifting rod head 50. The head 50 is connected to a lifting rod or stem 52 and to a guide rod 54 extending rearwardly through a movable core 56. A lifting hook 58 is attached to the core 56 and engages a lifting ring 60 when moved rearwardly.

The inner diameter of the lifting ring 60 slightly exceeds the outer diameter of the lifting rod 52 so that the rod 52 can move longitudinally relative to the ring when the ring is perpendicular thereto. The ring is normally held in that position by a lifting ring spring 62 which urges the ring against a rear extension of a stop plate 64. The plate 64 is held against shoulders in the main section 14 of the housing 12 by a main plunge spring 66. With this design, the lifting rod 52 can be moved back somewhat when the stud 24 is pressed against the workpiece prior to being welded. However, when the ring 60 is moved by the lifting hook 58 to a canted position, further retraction of the core 56 also causes the lifting rod 52 to retract the same distance as the core. Consequently, all of the studs to be welded will be retracted a uniform, predetermined distance from the workpiece during the lifting or retraction stroke, even though their length may differ somewhat so that some are pushed back more than others when initially pressed against the workpiece.

The movable core 56 is retracted when current is supplied through suitable leads 68 to a lifting or holding coil 70. The extent of the rearward movement of the core 56, which determines the distance the stud and the chuck are retracted, is determined by the position of an adjustable core piece 72.

When the stud 24 is initially pressed against the workpiece, it is retracted until the outer end of a spark shield 74 (or ferrule if used as a substitute) bears against the workpiece 26 or, specifically, against the layer 28. The spark shield is held by a holder or foot 76 and is supported by adjustable legs 78 which can be moved in and out relative to the body 12 of the tool to determine the position of the foot and the spark shield.

The components of the tool 10 discussed to this point are substantially conventional and operate in a substantially conventional manner, with the exception of the design of the adapter 42 and the extension 46. When the welding cycle is initiated, a voltage is imposed between the stud the the workpiece through a welding cable 80 connected to the cable clamp 48. Substantially at the same time, the coil 70 is energized to retract the movable core 56 and the stud 24 from the workpiece to draw a pilot arc therebetween. A heavier voltage is then imposed between the stud and the workpiece through the cable 80 causing a welding arc to be established. After a predetermined time, the coil 70 is deenergized to enable the plunge spring 66 to plunge the stud back toward the workpiece. The welding arc will have formed molten portions on the stud and the workpiece prior to the contact therebetween at the end of the plunge stroke. However, if the layer 28 prevents sufficient electrical contact between the stud 24 and the workpiece 26, the controls are designed so that welding cycle will not be initiated at all. If such prevention is not designed into the controls, the cycle may commence with the stud being retracted, but no pilot arc and subsequently no welding arc will be established, with the result that no weld will be made.

In accordance with the invention, by rotating the stud 24, the tip 32 will penetrate the layer 28 to establish the proper electrical contact. As discussed, the rotation can be effected by hand, or by drive means. The latter is preferred and for this purpose, the chuck adapter 42 has a sprocket 82 affixed thereto near its rearward end, with the sprocket having two rows of teeth 84 and 86. When the sprocket is driven, the chuck adapter 42 rotates on a sleeve bearing 88 located on a shank 90 of the chuck adapter extension 46, with a large rear annular surface 92 of the chuck adapter 42 bearing against an electrical contact washer 94 made of metal-graphite brush material.

The contact washer 94, as shown particularly in FIG. 5, actually is made of a plurality of segments 96, three in this instance, each having an inwardly-extending arcuate web 98 and an axially-extending arcuate flange 100. In place of the flanges 100, a single disc could be employed with the webs 98 being separate therefrom to maintain better electrical contact as the components wear. The front surface of the web 98 bears against the large annular end surface 92 of the chuck adapter 42 while the inner surface of the forward portion of the flange 100 bears against a cylindrical surface 102 of the chuck adapter 42. The flange 100 is urged against the cylindrical surface 102 by a resilient outer ring 104 which urges all three of the segments 96 inwardly. The rear portion of the arcuate flange 100 is similarly urged by the resilient ring 104 against a cylindrical surface 106 of the chuck adapter extension 46. The extension 46 also has a forward annular surface 108 which bears against the rear surface of the arcuate web 98. An insulating sleeve 109 extends between the washer 94 and the extension shank 88, and also between the rear portion of the adapter 42 and the shank 88. The segments 96 can also be used without the webs 98. In that instance, an insulating washer can be positioned between the surfaces 92 and 108.

To maintain contact between the arcuate webs 98 and the surfaces 92 and 108, a compression coil spring 110 is located around a forward portion of the extension shank 90 with the rear end of the spring bearing against the sleeve bearing 88 and the forward end of the spring bearing against a seat 112 of insulating material. The seat 112 is held in position by a washer 114 and a centrally-located screw 116. The spring 110 thereby maintains the adapter extension 46 and the adapter 42 in electrical contact with the webs 98 of the segments 96 while the resilient ring 104 maintains the flanges 100 in contact with the cylindrical surfaces 102 and 106 of the chuck adapter and the extension. This relatively large contact area between the components enables the current to flow from the cable 80 to the stud 24 with little resistance between the stationary chuck adapter extension 46 and the rotating chuck adapter 42.

The double sprocket 82 on the adapter 42 can be driven through a commercially-available double chain 118 which is flexible to remain properly engaged with the teeth 84 and 86 even as the chuck adapter 42 along with the other components are retracted to retract the stud during the welding cycle. The chain 118 extends through slots or openings 120 and 122 (FIG. 4) in the front cover 22 and is engaged with a double drive sprocket 124 having two rows of teeth 126 and 128. The drive sprocket 124 is mounted on a drive shaft 130 of a small drive motor or unit 132. The motor 132, in turn, is mounted on a bracket 134 which is affixed to the side of the main section 14 of the welding tool body 12 by suitable fasteners 136. The motor 132 can be air-driven and is light in weight as well as being small. Consequently, the rotating drive means does not add appreciably to the weight of the tool and does not obstruct the operation thereof.

In the operation of the welding tool 10 with the stud rotation means, when a trigger 138 is pulled to close its electrical switch contacts, an air control valve 140 in an air supply line 142 for the motor 132 is opened to supply air thereto and to cause the chuck adapter 42, the chuck 34, and the stud 24 to rotate. The rate of rotation is not critical, but rates of 500 to 1,000 rpm of the chuck adapter 42 have been satisfactory. The pressure of the air determines the speed of the motor 132, with a pressure of 70 psi producing a speed of 650 rpm for the motor, by way of example. When effective electrical contact is established between the stud 24 and the workpiece 26 through the layer 28, the stud welding cycle is then initiated. This can be done automatically and at this time, the valve 140 for the motor 132 can be closed to stop the rotation of the stud 24. However, it is not essential that the stud rotation be terminated immediately upon the initiation of the welding cycle since even if rotation is continued throughout the welding cycle, when the stud 24 is welded to the workpiece at the end of the plunge stroke of the stud, the now-stationary, welded stud will simply slip in the chuck 34 as the latter continues to rotate.

While the stud is rotating, a voltage can be imposed between the stud and the workpiece through the layer 28. Particularly with paint, the resulting heat from the current can help to soften the layer. In such an instance, the current can be shut off before the stud is stopped, to assure that the stud will not be resistance-welded to the workpiece.

It has been found that the penetrating effect of the stud can be increased if the flux 32 at the end of the stud is provided with a sharp or abrupt edge, as can be accomplished by forming a groove or slot 144 therein, as shown in FIG. 7. The periphery of the body of flux 32 is shown somewhat irregular, which results when the studs are tumbled after they are formed. Penetration is also improved over a stud with a plain end if it is provided with a knurled pattern 146 embossed in the tip, as shown in FIG. 8. Penetration is also increased if the flux 32 is provided with a center punched recess 148 which produces rough edges at the flux tip, as shown in FIG. 9.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. Apparatus for welding a stud to a workpiece having an electrically-resistant coating thereon, said apparatus comprising a welding tool having chuck means extending outwardly therefrom for holding a weldable stud, means for moving said chuck means toward and away from the workpiece, means connected to said chuck means for rotating said chuck means, electrically-conducting means positioned adjacent portions of said chuck means and said moving means and in contact with both, said electrically-conducting means being generally radially segmented, means engagable with the segments for urging them radially inwardly, and resilient means for urging said chuck means and said moving means toward one another.

2. Apparatus according to claim 1 characterized by said chuck means being rotatably carried on a shank extending from said moving means toward the workpiece, and said resilient means being carried by said shank for urging said moving means and said chuck means toward one another.

3. Apparatus according to claim 1 characterized by said chuck being rotatably carried by a shank extending from said moving means toward the workpiece.

4. Apparatus for welding a stud to a workpiece having an electrically-resistant coating thereon, said apparatus comprising a welding tool having chuck means extending outwardly therefrom for holding a weldable stud, means rotatably carrying said chuck means for moving said chuck means toward and away from the workpiece, means connected to said chuck means for rotating said chuck means, said chuck means having a cylindrical surface near said moving means, electrically-conducting means located around said cylindrical surfaces and in contact with both, said electrically-conducting means being generally radially segmented, and a resilient band extending around the segmented electrically-conducting means for urging said electrically-conducting means toward said cylindrical surfaces.

5. Apparatus for welding a stud to a workpiece having an electrically-resistant coating thereon, said apparatus comprising a welding tool having a chuck for holding a weldable stud, means for establishing an electrical potential between the stud and the workpiece, means for moving said chuck toward and away from the workpiece, a motor carried by said tool, a driven toothed member connected to and rotatable with said chuck, a drive toothed member rotated by said motor, means connecting said driven toothed member and said drive toothed member causing said drive toothed member to rotate said driven toothed member when said drive toothed member is rotated by said motor, said moving means having a cylindrical surface extending toward said chuck and said chuck having a cylindrical surface extending toward said moving means, and an electrically-conducting washer located around said cylindrical surfaces and in contact with both.

* * * * *

UNITED STATES PATENT OFFICE
CERTIFICATE OF CORRECTION

PATENT NO. : 4,074,103
DATED : February 14, 1978
INVENTOR(S) : Thomas E. Shoup and Steve Spisak It is certified that error appears in the above-identified patent and that said Letters Patent are hereby corrected as shown below:

insert    Column 7, line 11, after "means," first occurrence, --said moving means having a cylindrical surface near said chuck means,--.

Signed and Sealed this

Twenty-fourth Day of October 1978

[SEAL]

Attest:

RUTH C. MASON
Attesting Officer

DONALD W. BANNER
Commissioner of Patents and Trademarks